United States Patent [19]
Eichenhofer

[11] 3,866,729
[45] Feb. 18, 1975

[54] ELECTROMAGNETIC OPERATED CLUTCHES AND BRAKES

[75] Inventor: Josef Eichenhofer, Brampton, Canada

[73] Assignee: Automatic Research Development Co., Willoughby, Ohio

[22] Filed: June 13, 1973

[21] Appl. No.: 369,502

[52] U.S. Cl. .............................. 192/84 C, 188/161
[51] Int. Cl. .......................... F16d 27/04, B60l 7/00
[58] Field of Search............ 192/84 C, 84 AB, 84 R, 192/84 A; 188/161

[56] References Cited
UNITED STATES PATENTS

| | | | |
|---|---|---|---|
| 665,318 | 1/1901 | Garrett | 192/84 C |
| 786,420 | 4/1905 | Cutler | 192/84 AB |
| 3,300,008 | 1/1967 | Mendenhall | 192/84 C |
| 3,404,762 | 10/1968 | Leblanc | 192/84 C |
| 3,484,816 | 12/1969 | Davidson | 192/84 C |
| 3,734,256 | 5/1973 | Compton et al. | 188/161 |

FOREIGN PATENTS OR APPLICATIONS

| | | | |
|---|---|---|---|
| 335,748 | 3/1959 | France | 188/161 |
| 88,341 | 5/1958 | Netherlands | 192/84 AB |

*Primary Examiner*—Samuel Scott
*Assistant Examiner*—P. S. Lall
*Attorney, Agent, or Firm*—Ridout & Maybee

[57] ABSTRACT

In an electromagnetic clutch, stray magnetic fields on the axis of the clutch are minimized by arranging the poles of the magnet core radially and positioning the armature with respect to the core so as to complete a magnetic circuit of generally toroidal shape.

12 Claims, 7 Drawing Figures

ELECTROMAGNETIC OPERATED CLUTCHES AND BRAKES

FIELD OF THE INVENTION

This invention relates to electromagnetically operated clutches and brakes, and is applicable, for example, to friction clutches and brakes of the multiple disk type.

BACKGROUND OF THE INVENTION

In a multiple disk clutch, for example, the disks are connected alternately to the driving and driven members of the clutch, and are brought into engagement against the pressure of strong springs by the action of an electromagnet. When the electromagent is energized the magnetic flux may pass directly through the disks, if these are of steel, or may actuate an armature or pressure ring which compresses the stack of disks; in the latter case the disks may be of non-ferromagnetic material. Clutches in which the flux acts directly on the disks are self-adjusting for wear. The main problem with these clutches, however, lies in the difficulty of generating and locating the necessary magnetic field in such a way as to avoid magnetisation of the central shaft and nearby parts of the transmission. This is an especially serious problem with machine tools, since stray flux is likely to lead to the collection of abrasive chips in regions where they will damage collets, pushers, spindles, bearings or the like.

The above-mentioned problem is very difficult to overcome with existing clutch (or brake) designs, since the coil of the electromagnet is usually concentric with the central shaft of the clutch and produces a stray field along the axis of the shaft, which thus becomes a magnet. A degaussing coil mounted as close as possible to the primary field is commonly used for the purpose of neutralizing this stray field, but the use of a degaussing coil is expensive and not always entirely successful.

SUMMARY OF THE INVENTION

The object of the present invention is to provide a new design of electromagnetically operated clutch or brake in which the problem of neutralizing the stray field is solved without the need for additional devices such as degaussing coils.

According to the present invention the electromagnet of an electromagnetically operated clutch or brake has an annular core with a plurality of radial pole pieces carrying the energizing coils, and an armature providing a pair of pole faces arranged to cooperate respectively with the ends of the pole pieces and an annular end face of the core to complete the magnetic circuit. With such an arrangement, in which the coils of the electromagnet are symmetrically arranged around the axis, the components of the stray magnetic field cancel one another out.

Although the invention is especially applicable to electromagnetically operated multiple disk clutches and brakes for machine tools, and will be described particularly with reference to a multiple disk clutch, it is to be understood that the invention is readily applicable to other electromagnetically operated clutches and brakes in which stray magnetic fields may be disadvantageous.

Thus, the invention may readily be applied to any electromagnetic clutch or brake comprising a first rotatable torque transmitting member defining a rotary axis, first and second mutually engageable members adapted when engaged to transmit torque between the first torque transmitting member and a second torque transmitting member, and an electromagnet having a movable armature which is operable to effect engagement and disengagement of the mutually engageable members.

An important feature of the invention, according to one of its aspects, is that the energizing means of the electromagnet comprises a plurality of preformed coils replaceably mounted on the pole pieces, each coil having a mounting providing a pair of terminal connections to the coil, and a plurality of interchangeable connector means for connecting the coils in different selected electrical configurations.

BRIEF DESCRIPTION OF THE DRAWINGS

One embodiment of the invention, as applied to a multiple disk clutch, is illustrated by way of example in the accompanying drawings. In the drawings.

DESCRIPTION OF THE PREFERRED EMBODIMENT

Figure 1:
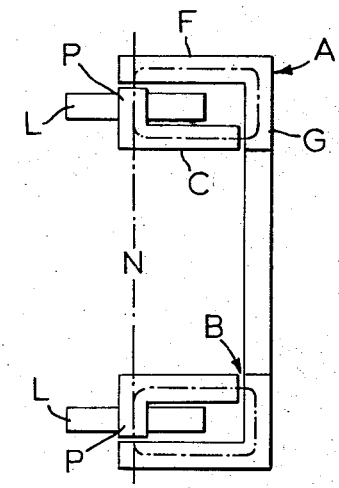
FIG. 1 is a diagrammatic representation of the electromagnetic circuit of the clutch, showing a section through the clutch axis.
Figure 2:
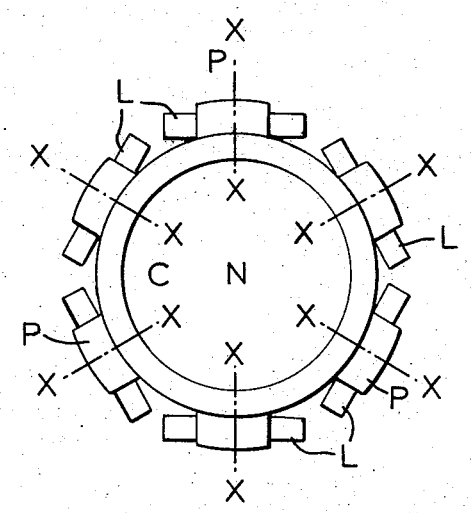
FIG. 2 is a diagrammatic end view of the electromagnet shown in FIG. 1, with the armature removed.

Referring to FIGS. 1 and 2, the electromagnet of the clutch comprises essentially an annular magnetic core C having six radial pole-pieces P, the axes of which are denoted by the chain-dot lines X—X in FIG. 2. Mounted on each pole-piece P is a coil L, the coils being equally spaced around the axis of the electromagnet and symmetrically arranged so that there is a neutral zone N on the axis where the components of magnetic flux cancel out. Cooperating with the core of the electromagnet is an armature A having a peripheral, axially extending flange-like portion F defining a cylindrical first face which confronts the ends of the pole-piece P; the armature A also has a radially extending flange-like portion G defining an annular face which confronts an opposed annular face of the core C and is separated therefrom by an air gap B. The magnetic circuit is completed through the pole-pieces P, the axially extending cylindrical portion C of the core, the air gap B, the armature A and its flange-like portion F. When the electromagnet is energized, the armature is attracted to the core and moves axially to actuate the clutch.

Figure 3:
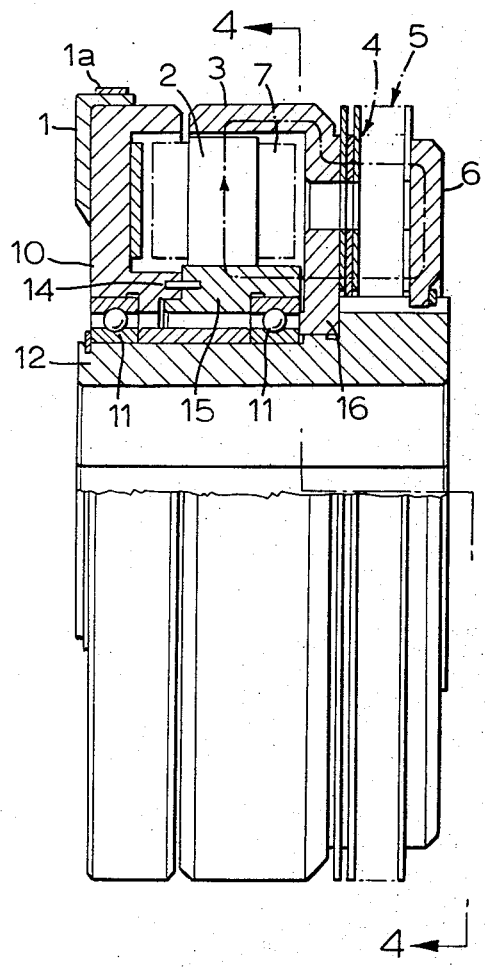
FIG. 3 is a half-sectional side view of the clutch.
Figure 4:
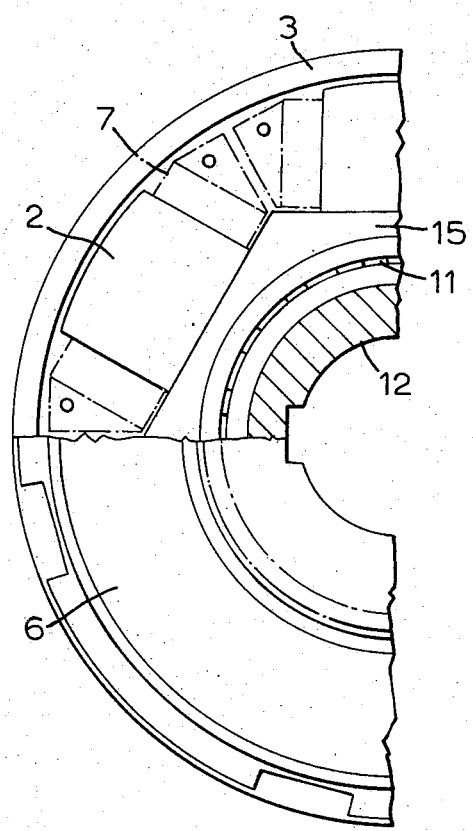
FIG. 4 is a half-sectional, half-elevational view from one end taken on line IV—IV in FIG. 3.

Referring now to FIGS. 3 and 4, which show the application of this principle to a multiple disk friction clutch employing steel disks or plates, the two sets of clutch disks 4, 5 are alternately splined to a drive sleeve 12, and to a driven member (not shown). The drive sleeve 12 is in turn splined to a drive shaft (not shown) and is preferably of non-magnetic material such as brass. The sleeve 12 is rotatably journalled in a non-magnetic housing 10, of brass for example, by ball bearings 11. Located within the housing 10 and keyed thereto by pins 14 is an electromagnet comprising an annular core 15 of ferromagnetic material, the core having six radial pole pieces 2 on which coils 7 are mounted. The armature of the electromagnet is a composite rotatable assembly, in the present embodiment, comprising a first annular member 3 cooperating with the ends of the pole-pieces 2, a second annular member 16 cooperating with an annular end face of the core 15, the stack of clutch discs 4, 5, and an axially movable armature member 6 which completes the magnetic circuit through the annular members 3 and 16 and the clutch discs 4 and 5.

Figure 6:
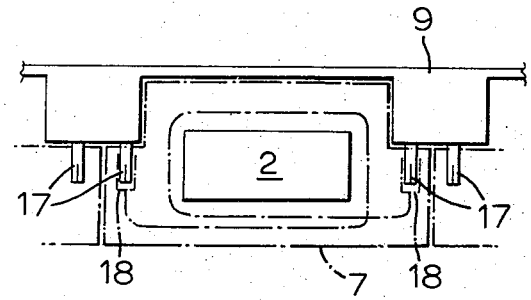
FIG. 6 shows a detail of the electrical connections to the coils of the electromagnet.
Figure 5:
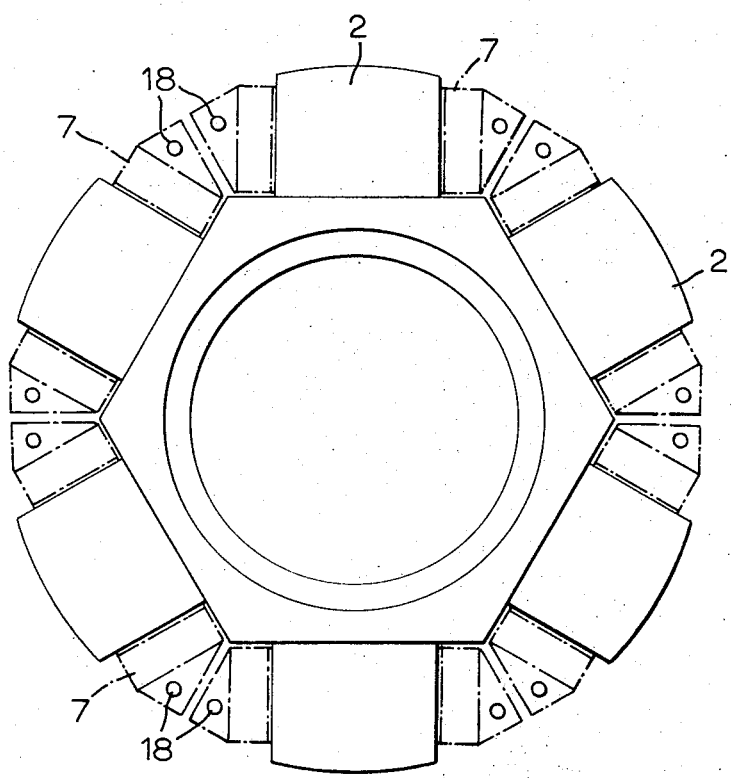
FIG. 5 is a partly diagrammatic view showing the configuration of the core of the electromagnet, with energizing coils.
Figure 7:
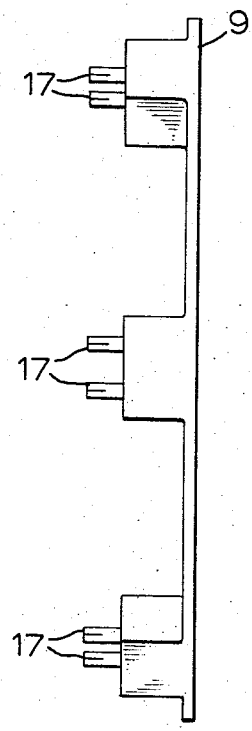
FIG. 7 is a side view of a collector ring for providing electrical connections to the coils.

As further illustrated in FIGS. 5, 6 and 7, the coils 7 are interconnected by a collector ring 9 having contact pins 17 which engage in sockets 18 in mountings for the coils, the collector ring being of insulating material. The sockets extend axially in the mountings and provide terminal connections to the coils. Electrical leads from the contact pins on the collector ring are connected to terminals 1a on a terminal block 1 mounted on the housing 10 (FIG. 3).

Preferably, three interchangeable collector rings are provided with the clutch for interconnecting the energizing coils of the electromagnet in different ways according to requirements. For example, if the unit is to be used as a brake giving a fast braking action, the coils are connected in parallel. On the other hand, for normal response in which maximum holding torque is required, the coils should be connected in series. Furthermore, by connecting the coils in opposite pairs and applying a sequential braking, a rotating magnetic field can be generated whereby, angular positioning is made possible by means of the clutch.

The main advantage of the construction described is that the electromagnet assembly, with radial poles and cooperating armature, substantially eliminates stray magnetic fields on the axis of the unit which could be particularly damaging in applications to machine tools.

A second important advantage, however, is that the unit is compact and easy to assemble and dismantle; the coils 7 are preformed coils which can very easily be replaced individually.

A third important advantage is that the construction makes it a simple matter to adapt the unit for different purposes by replacement of one form of collector ring for another, as described, so as to obtain desired response characteristics.

What I claim as my invention is:

1. An electromagnetically operated clutch or brake comprising:
    a first rotatable torque transmitting member defining a rotary axis,
    first and second mutually engageable members adapted when engaged to transmit torque between said first rotatable torque transmitting member and a second torque transmitting member, and
    an electromagnet having a core and a movable armature mounted coaxially with the first rotatable torque transmitting member, the armature being axially displaceable in relation to the core to effect engagement of said mutually engageable members, the core being of annular configuration providing an annular end face, and having a plurality of radial pole pieces symmetrically arranged around said axis, and
    the armature being of annular configuration providing a first face confronting the ends of said pole pieces and an annular second face confronting said annular end face of the core.

2. An electromagnetically operated friction clutch or brake in accordance with claim 1, said mutually engageable members being constituted by mutually engageable friction plates.

3. An electromagnetically operated multiple disk clutch or brake in accordance with claim 1, said mutually engageable members being constituted by first and second sets of alternately spaced friction plates.

4. An electromagnetically operated clutch or brake according to claim 1, there being a plurality of pairs of said pole pieces, the pole pieces of each pair being diametrically opposed.

5. An electromagnetically operated clutch or brake according to claim 4, in which the electromagnet has an energizing winding constituted by preformed coils removably mounted on the pole pieces, and means electrically interconnecting said coils.

6. In combination with an electromagnetically operated clutch or brake according to claim 4, an energizing winding constituted by a plurality of preformed coils adapted to be replaceably mounted on said pole pieces, each coil having a mounting means including a pair of axially extending sockets providing terminal connections to the coil, and interchangeable means for interconnecting the coils, said interchangeable means comprising first and second collector rings, each collector ring providing a set of axially extending contact pins engageable in said sockets, and circuit means interconnecting the contact pins with electrical terminal means for selectively interconnecting the coils in a predetermined electrical configuration.

7. The combination claimed in claim 6, wherein the contact pins of one of the collector rings are interconnected so as to connect the coils in series.

8. The combination claimed in claim 6, wherein the contact pins of one of the collector rings are interconnected so as to connect the coils in parallel.

9. The combination claimed in claim 6, wherein the contact pins of one of the collector rings are interconnected so as to connect the coils in opposite pairs for applying a rotating magnetic field.

10. In an electromagnetically operated clutch or brake having an electromagnet which is operable to effect engagement between first and second mutually engageable members for transmitting torque between respective torque transmitting members, the electromagnet comprising a core, a movable armature, and energizing means therefor, the improvement wherein said core is of annular configuration providing an annular end face, and has a plurality of pairs of symmetrically arranged, radially outwardly extending, pole pieces, the pole pieces of each pair being diametrically opposed, said armature being of annular configuration providing a cylindrical first face confronting the ends of said pole pieces and an annular second face confronting said annular end face of the core.

11. The combination claimed in claim 10, wherein said energizing means comprises a plurality of preformed coils replaceably mounted on the pole pieces, each coil having a mounting providing a pair of terminal connections to the coil, and a plurality of interchangeable connector means adapted to cooperate with said terminal connections for connecting the coils in different selected electrical configurations.

12. The combination claimed in claim 11, wherein each coil mounting includes a pair of axially extending pin-sockets constituting said terminal connections, each of said interchangeable connector means comprising a collector ring having axially extending pins engageable in said sockets and means interconnecting the pins for determining a selected one of said configurations.

* * * * *